United States Patent
Dreifus

(10) Patent No.: US 8,285,209 B2
(45) Date of Patent: Oct. 9, 2012

(54) SHORT RANGE FM MODULATOR/TRANSMITTER AND SYSTEM INCORPORATING SAME

(75) Inventor: David Dreifus, Clinton, NJ (US)

(73) Assignee: Agere Systems, Inc., Allentown, PA (US)

( * ) Notice: Subject to any disclaimer, the term of this patent is extended or adjusted under 35 U.S.C. 154(b) by 439 days.

(21) Appl. No.: 12/514,152

(22) Filed: May 8, 2009

(65) Prior Publication Data

US 2011/0092156 A1  Apr. 21, 2011

(51) Int. Cl.
H04B 7/00 (2006.01)

(52) U.S. Cl. .................................................. 455/41.2

(58) Field of Classification Search .................. None
See application file for complete search history.

(56) References Cited

U.S. PATENT DOCUMENTS

| | | | |
|---|---|---|---|
| 5,970,390 A | 10/1999 | Kogo et al. | |
| 6,031,818 A | 2/2000 | Lo et al. | |
| 6,038,434 A | 3/2000 | Miyake | |
| 6,212,175 B1 | 4/2001 | Harsch | |
| 6,711,380 B1* | 3/2004 | Callaway, Jr. | 455/41.2 |
| 6,850,285 B2* | 2/2005 | Eaton et al. | 348/563 |
| 7,149,474 B1* | 12/2006 | Mikhak | 455/41.2 |
| 7,515,935 B2* | 4/2009 | Ibrahim et al. | 455/553.1 |
| 7,979,027 B2* | 7/2011 | Vanharlingen et al. | 455/41.2 |
| 2003/0036357 A1 | 2/2003 | McGowan | |
| 2003/0153292 A1 | 8/2003 | Groeger et al. | |
| 2003/0236075 A1 | 12/2003 | Johnson et al. | |
| 2004/0117442 A1 | 6/2004 | Thielen | |
| 2004/0267390 A1 | 12/2004 | Ben-Yaacov et al. | |
| 2005/0143139 A1 | 6/2005 | Park et al. | |
| 2006/0141962 A1 | 6/2006 | Forbes et al. | |
| 2006/0223467 A1 | 10/2006 | Mason | |
| 2009/0054020 A1 | 2/2009 | Mason | |

FOREIGN PATENT DOCUMENTS

| | | |
|---|---|---|
| EP | 1126707 | 8/2001 |
| GB | 2399719 | 9/2004 |
| GB | 2406488 | 3/2005 |

* cited by examiner

Primary Examiner — Lincoln Donovan
Assistant Examiner — Khareem E Almo

(57) ABSTRACT

A short range radio transmitter device includes a radio signal modulator and transmitter, a receiver and a controller coupled to the receiver. The controller and receiver operate to examine a frequency spectrum to select a transmission frequency for the radio signal modulator and transmitter. A receiver system for use with the transmitter includes a data channel service enabled receiver and a controller. The controller of the receiver system automatically tunes the data channel service enabled receiver to a frequency identified in a data channel service component of a received signal.

19 Claims, 4 Drawing Sheets

100

100

200

10

SHORT RANGE FM MODULATOR/TRANSMITTER AND SYSTEM INCORPORATING SAME

FIELD OF THE INVENTION

The present invention relates to short range transmission and reception systems.

BACKGROUND OF THE INVENTION

Short range FM modulator/transmitter devices have become common for short range (e.g., within a home) broadcasting of content from portable satellite receivers, MP3 players, and other consumer electronic devices to standard FM radio receivers for play. In one example, a MP3 player is docked or otherwise connected to a low power short range FM modulator/transmitter. The FM modulator/transmitter is tuned to a selected broadcast frequency along with the user's home stereo. The content is then broadcast at the selected frequency, received by the home stereo (or other FM receiver) and played.

Interference, noise or licensed radio station broadcasts in the FM band can impair or cause loss of the received signal from the short range FM modulator/transmitter. For example, when using these systems in a mobile environment, such as in a car, changes in geography or interference from systems in use in surrounding cars can affect the received signal. In the home environment, interference can occur from the use of multiple systems in the same home or from use by neighbors. Typically, this interference is addressed by manually searching for an open FM band and then manually tuning both the modulator/transmitter and the radio receiver to the new frequency. This process can be frustrating and problematic, particularly in the mobile environment.

SUMMARY OF THE INVENTION

A short range radio transmitter device includes a radio signal modulator and transmitter, a receiver and a controller coupled to the receiver. The controller and receiver operate to examine a frequency spectrum to select a transmission frequency for the radio signal modulator and transmitter. A receiver system for use with the transmitter includes a data channel service enabled receiver and a controller. The controller of the receiver system automatically tunes the data channel service enabled receiver to a frequency identified in a data channel service component of a received signal.

The above and other features of the present invention will be better understood from the following detailed description of the preferred embodiments of the invention that is provided in connection with the accompanying drawings.

BRIEF DESCRIPTION OF THE DRAWINGS

The accompanying drawings illustrate preferred embodiments of the invention, as well as other information pertinent to the disclosure, in which.

DETAILED DESCRIPTION

A short range transmission/reception system is described which automatically identifies acceptable transmission frequencies for use by the system. In embodiments, a FM receiver is incorporated into a FM transmitter device to scan the FM band and identify or locate FM stations with minimal signal transmission interference for use by the system. In embodiments, the FM transmitter is configured to transmit data identifying a selected FM station to a receiver, such as using the radio broadcast data system (RDBS) or Radio Data System (RDS) functionality built into the FM transmitter. Tuning to the recommended new FM station can be manual, in which case the recommended transmission frequency is displayed to a user on a display or audibly conveyed, or automatic, in which case the transmitter and/or receiver can be automatically tuned to the new transmission frequency and, in embodiments, automatically track each other as the interference profile from licensed broadcast stations or other interference sources changes over time and/or location.

The RDS standard is set by the European Broadcasting Union for sending small amounts of digital information using conventional FM radio broadcasts. The RDS system standardizes various types of information for transmission, including time and station identification. Similarly, the RDBS standard is the United Slates version of RDS. The two standards are nearly identical, with only slight differences mainly in which numbers are assigned to each of the thirty-one musical and other program formats the RBDS can identify. The RDBS standard has been approved by the National Radio Systems Committee in the United States and is described in "United States RBDS Standard Specification of the Radio Broadcast Data System (RBDS)", Apr. 9, 1998, which is hereby incorporated by reference herein (hereinafter, "U.S. RBDS Standard Specification").

Figure 1:
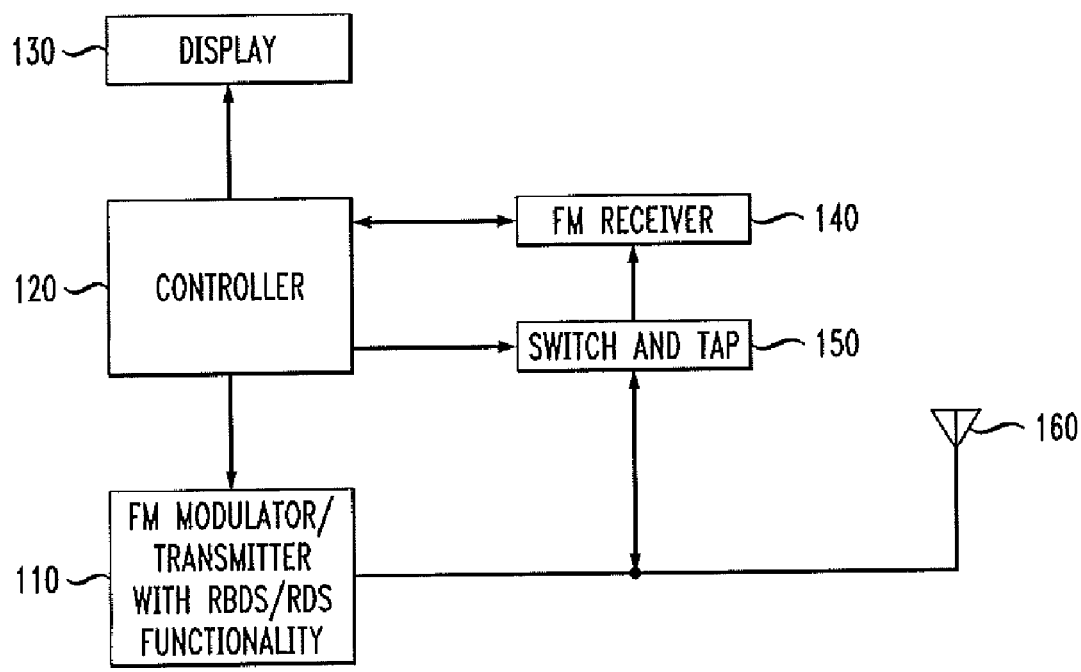
FIG. 1 is a block diagram of a short range FM modulator/transmitter device according to one embodiment of the present invention.
Figure 2:
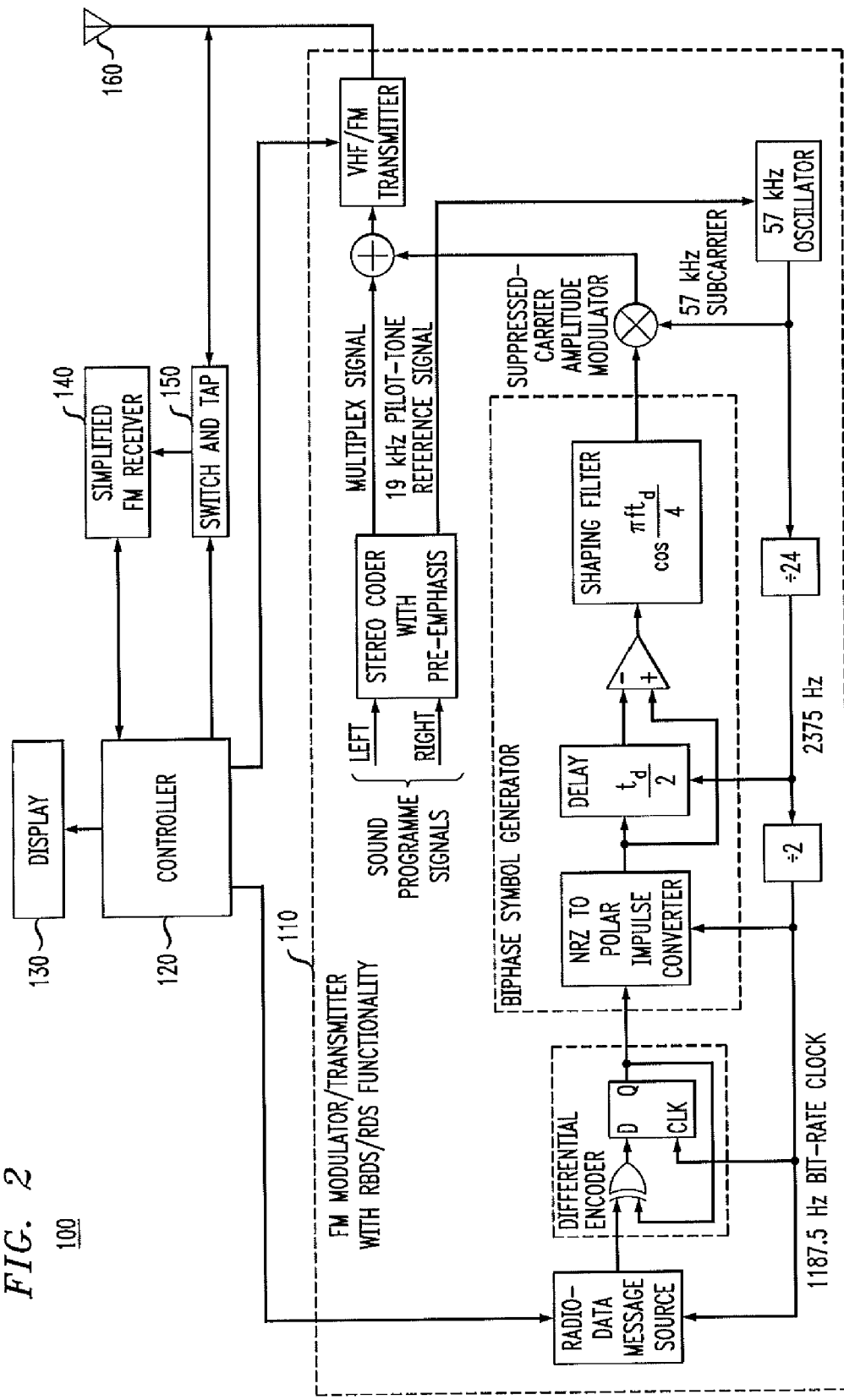
FIG. 2 is a diagram of the FM modulator/transmitter of FIG. 1 illustrating in more detail the data channel service enabled FM modulator/transmitter component of the modulator/transmitter device.

FIG. 1 is a block diagram of a FM transmitter device 100. In embodiments, the transmitter device 100 include a FM modulator/transmitter 110 enabled to transmit small amounts of digital data, such as with RBDS or RDS functionality. For example, the RBDS and RDS specifications provide for data transmission in a 57 kHz subcarrier to carry data at 1187.5 bits per second. In one embodiment, the device 100 utilizes the Alternate Frequency data field in the RDS/RBDS standard to communicate the alternate transmission frequency, though any available data field may be utilized. The FM modulator/transmitter 110 is known per se in the art, an example of which is shown in the diagram of FIG. 2 and as described in the U.S. RBDS Standard Specification. The FM transmitter device 100 also includes an antenna 160 for transmission and reception of FM signals, a controller 120, a display 130, a simple FM receiver 140 and a switch and tap module 150 coupled to the antenna 160.

Figure 4:
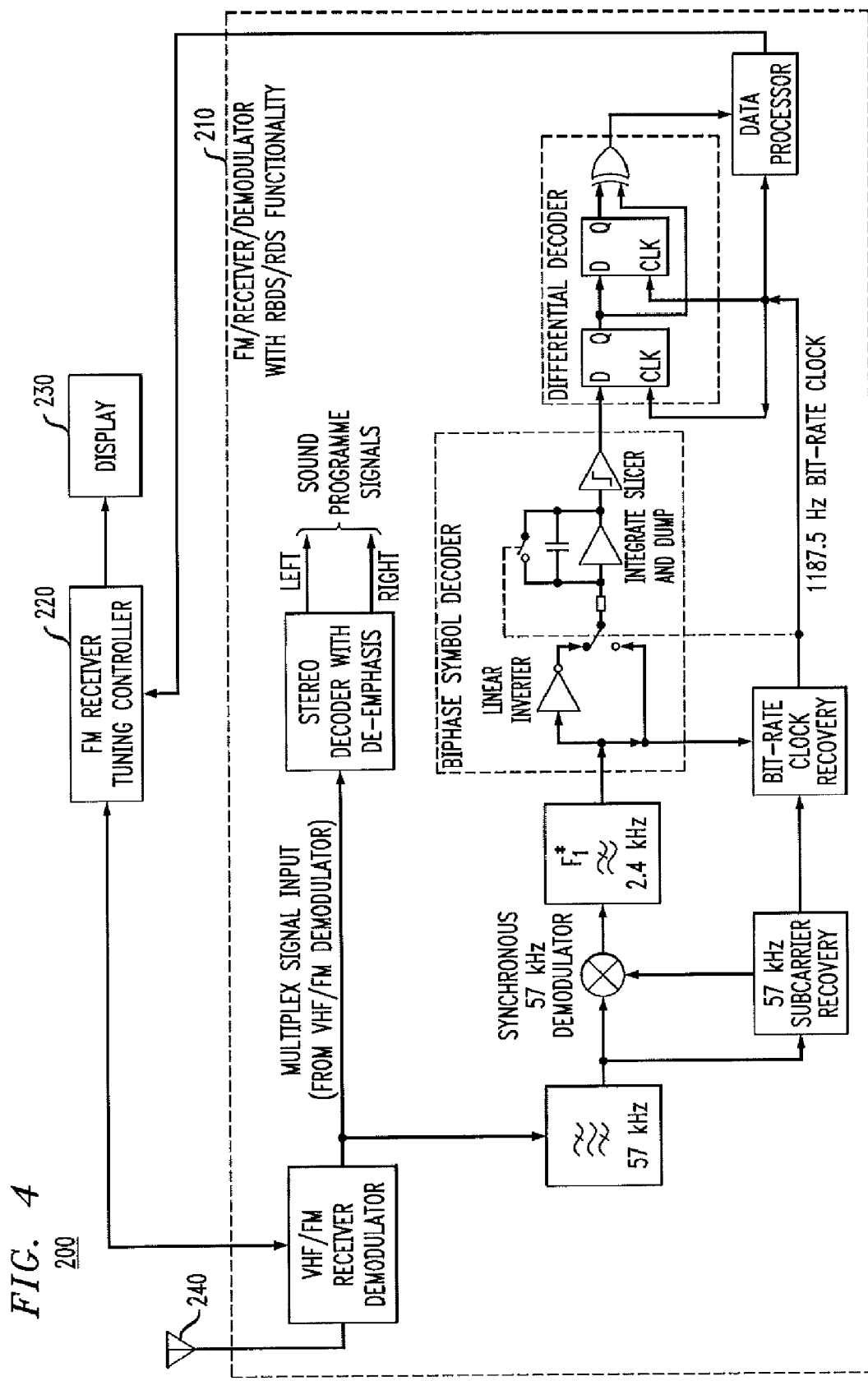
FIG. 4 is a diagram of the FM receiver unit of FIG. 3 illustrating in more detail the data channel service enabled FM demodulator/receiver component of the receiver unit.

Although the transmission/reception system, as shown in FIGS. 2 and 4, utilizes REDS enabled transmitters and receivers, any data transmission technique capable of transmitting selected frequency data, such as in a side band of transmission channel, may be used. In embodiments, the data is transmitted as part of a high definition radio data stream or other data stream. FM devices capable of transmitting and receiving this data are referred to herein as "data channel service enabled."

The FM receiver 140 is of conventional design and is also known per se in the art. The FM receiver 140 is coupled to the antenna 160 through the switch and tap module 150. The switch and tap module 150 includes a switch that can interrupt the transmission of signals by the antenna 160 and/or by FM modulator/transmitter 110 under control of the controller 120, and a tap for providing FM signals received by the antenna 160 to FM Receiver 140. Of course, the tap component is not necessary if the FM receiver 140 has its own antenna 160. In embodiments, the transmitter controller 120 described herein can be a microprocessor programmed to operate in accordance with the following description.

The FM receiver 140 can be configured as a simple spectrum analyzer, such as is used in some BLUETOOTH® enabled devices. The controller 120 initiates a scan of the FM band. The FM receiver 140 or even a simple RF detector sweeps through the frequencies measuring the amount of RF energy at each radio station frequency. A FM receiver would normally lock into a station and demodulate the signal, but this functionality is not required of the FM receiver 140 in order to detect interference. The FM receiver 140 provides the power spectrum across the FM band to the controller 120. The controller 120 examines the power spectrum of the FM band to identify a frequency or frequencies with the least amount of interference, i.e., those frequencies with the smallest power levels. The controller 120 then selects a frequency for use by the FM modulator/transmitter 110, such as the frequency with the lowest power level.

The controller 120 and FM receiver 140 can continuously or periodically monitor the power spectrum of the FM band. If increases in power above a selected power threshold are detected at and/or around the transmission frequency currently in use by the FM modulator/transmitter 110, the controller 120 determines that unacceptable levels of noise or interference are present and examines the FM band for acceptable alternative for a new transmission frequency, i.e., a frequency at which the power level is below a selected power threshold.

In embodiments, the controller 120 causes the transmission by the FM modulator/transmitter 110 to temporarily stop during this examination by switching off transmission via the switch of switch and tap module 150. In this manner, the FM band examined by the FM receiver 140 and controller 120 of the device 100 is not overwhelmed or swamped by its own transmission from the FM modulator/transmitter 110. The transmission from FM modulator/transmitter 110 need only be turned off for a very short period of time in order to take a snap shot of the power spectrum of the FM band, such as for a period that is imperceptible or nearly imperceptible to the listener.

As described above, in one embodiment, the controller 120 and FM receiver 140 perform their analysis in a periodic manner, such as every 30 seconds or other increment. Alternatively, the controller 120 and FM receiver 140 can continuously monitor the FM power spectrum.

In embodiments, the controller need not look at the entire FM spectrum. Rather, once noise or interference above a specified threshold is detected at the transmission frequency currently in use by the transmitter, the controller can begin a scan of the FM band (e.g., from 87.5-108.0 MHz) and select the first frequency that is below an acceptable power level threshold. Of course, any acceptable algorithm can be used to select the new transmission frequency, such as selection of the frequency with the smallest power footprint, selection of the frequency with a power footprint below a selected threshold and with neighboring frequencies exhibiting attractive power footprints, etc.

In one embodiment, once the controller 120 has selected a new transmission frequency, the controller 120 displays the frequency on display 130 or provides an audible identification of the frequency using speakers (not shown). The controller can also provide an audible notification that a new frequency is available, thereby prompting the user to view the display 130.

In an alternative embodiment, with reference to FIG. 2, the controller 120 automatically changes the transmission frequency of the FM modulator/transmitter 110 by controlling the VHF/FM transmitter of the FM modulator/transmitter 110. In embodiments, the controller 120 delays for a period of time before changing the transmission frequency of the FM modulator/transmitter 110 so that data identifying the newly selected transmission frequency can be sent to a remote receiver device, such as is shown in FIG. 3, using the transmission frequency already in use.

The controller 120 provides data to the FM modulator/transmitter 110 identifying the selected frequency. More specifically, the controller 120 provides the data to the radio-data message source component (FIG. 2) of the FM modulator/transmitter 110 for inclusion in a side band of the FM transmission sent by the FM modulator/transmitter 110. As discussed below, this frequency identification data is transmitted to the receiver device shown in FIGS. 3 and 4 for display or automatic tuning of the receiver to the selected frequency.

Figure 3:
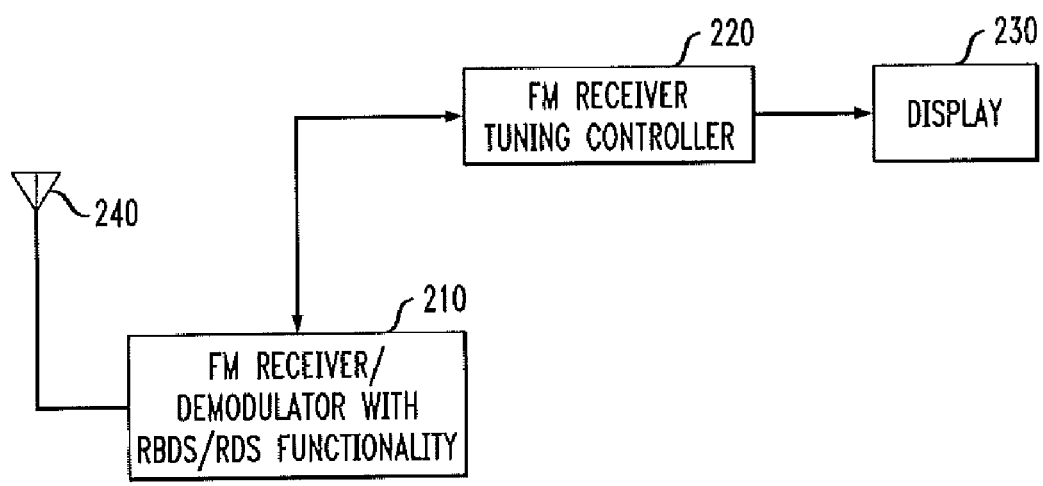
FIG. 3 is a block diagram of a FM receiver unit.

FIG. 3 is a block diagram of FM receiver device 200 for use with the FM transmitter 100 described above in connection with FIGS. 1 and 2. The FM receiver device 200 includes a data channel service enabled FM Receiver/Demodulator 210, such as a receiver having RBDS or RDS functionality. This receiver/demodulator unit 210 is known per se in the art, one example of which is illustrated in more detail in FIG. 4 and described in the U.S. RBDS Standard Specification. The receiver unit 200 also includes a FM Receiver Tuning Controller 220 and Display 230, which are described in more detail below. In embodiments, the FM Receiver Tuning Controller 120 described herein can be a microprocessor programmed to operate in accordance with the following description.

Turning to FIG. 4, the data channel service enabled FM Receiver/Demodulator unit 210 includes a standard VHF/FM Receiver/Demodulator which receives and demodulates and FM signal received at antenna 240 at a frequency to which it is tuned. The remaining components illustrated for the unit 210 provide a radio-data receiver/decoder that obtains the data identifying the newly selected transmission frequency transmitted with the FM signal received at the receiver unit 200. In operation, the VHF/FM Receiver/Demodulator of the unit 210 is tuned to the previously selected transmission frequency of the transmitter 100 either manually or by FM Receiver Tuning Controller 220. The VHF/FM Receiver/Demodulator receives the FM signal and demodulates the signal to provide sound signals for play. The data from the FM signal identifying the newly selected transmission frequency is retrieved by the radio-data receiver/decoder components of the unit 210 and provided to the FM Receiver Tuning Controller 220 from the data processor of unit 210.

In a manual embodiment, the FM Receiver Tuning Controller 220 displays the newly selected frequency on display 230 and may also provide an audible alarm that a new frequency is available. The user then manually tunes the VHF/FM Receiver Demodulator to the new frequency.

In an automated embodiment, the FM Receiver Tuning Controller 220 automatically tunes the VHF/FM Receiver Demodulator of the unit 210 to the frequency identified by the received frequency data.

The invention described herein is particularly suited for use in connection with various consumer electronics, such as satellite receivers, MP3 players, cell phones, personal media players, media centers, personal computers, and other consumer electronics that transmit content over short ranges (e.g., 10 meters or less) to FM radio receivers.

In one embodiment, the FM modulator/transmitter of FIG. 1 is provided in a first IC (integrated circuit) chip and the controller 120 and FM receiver/spectrum analyzer 140 are provided in a second IC chip. This configuration allows for the use of existing FM modulator/transmitter chips. Of course, if desired, the controller 120, FM receiver 140 and FM modulator/transmitter 110 can be integrated on a single IC chip. In embodiments, the FM receiver/tuning controller 220 of the receiver unit can be integrated with the FM receiver/demodulator 210 or be a separate IC.

As described above, various combinations of transmitters and receivers may be utilized in the transmission/reception system; common to all systems, however, is that the transmitter automatically identifies open transmission channel candidates for use by the system. Possible system embodiments include: (A) a standard receiver used in connection with a transmitter that selects and displays a newly selected frequency; the user manually changes the station on the transmitter and the receiver; (B) a data channel service enabled transmitter and a data channel service enabled receiver that displays the newly selected frequency; the user manually changes the station to the new frequency on receiver and the transmitter is manually or automatically tuned; and/or (C) data channel service enabled transmitter and receiver where the receiver and transmitter automatically track one another.

Although the invention has been described in terms of exemplary embodiments, it is not limited thereto. Rather, the appended claims should be construed broadly to include other variants and embodiments of the invention that may be made by those skilled in the art without departing from the scope and range of equivalents of the invention.

What is claimed is:

1. A short range radio transmitter device comprising:
   a radio signal modulator and transmitter;
   a receiver; and
   a controller coupled to said receiver, wherein said controller and receiver operate t examine a frequency spectrum to select a transmission frequency for said radio signal modulator and transmitter wherein said radio signal and transmitter is data channel service enabled, wherein the data, channel service enabled transmitter transmits data in a sideboard of a high definition radio data system.

2. The short range radio transmitter device of claim 1, wherein said controller provides an identification of said selected transmission frequency to said radio signal modulator and transmitter for transmission to a remote receiver.

3. The short range radio transmitter device of claim 2, wherein said controller automatically tunes said radio signal modulator and transmitter to said selected transmission frequency for transmission of radio signals after said identification is transmitted to said remote receiver.

4. The short range radio transmitter device of claim 1, wherein said controller automatically tunes said radio signal modulator and transmitter to said selected transmission frequency for transmission of radio signals.

5. The short range radio transmitter device of claim 1, further comprising a display, wherein said controller causes said display to display said selected transmission frequency.

6. The short range radio transmitter device of claim 1, wherein said controller interrupts transmission by said radio signal modulator and transmitter while said frequency spectrum is examined.

7. The short range radio transmitter device of claim 1, wherein said radio signal modulator and transmitter is a FM modulator and transmitter.

8. The short range radio transmitter device of claim 1, wherein said controller and receiver operate to examine said frequency spectrum when interference is detected at a previously selected transmission frequency.

9. The short range radio transmitter device of claim 1, wherein said controller and receiver operate to examine said frequency spectrum at periodic intervals.

10. The short range radio transmitter device of claim 1, wherein said controller and receiver examine power levels for respective frequencies within said frequency spectrum.

11. A receiver system comprising:
    a data channel service enabled receiver; and
    a controller, said controller automatically tuning said data channel service enabled receiver to a frequency identified in a data channel service component of a received signal, wherein the data channel service enabled receiver receives data in a sideband of a high definition radio data stream.

12. The receiver of claim 11, wherein said data channel service enabled receiver is a FM receiver.

13. A transmission and reception system, comprising: a short range radio transmitter device comprising: a data channel service enabled radio signal modulator and transmitter; a receiver;
    wherein the data channel service enabled transmitter transmits data in a sideband of a high definition radio data stream; a receiver; and a transmitter device controller coupled to said receiver, wherein said controller and receiver operate to examine a frequency spectrum to select a transmission frequency for said radio signal modulator and transmitter, and wherein said controller provides an identification of said selected transmission frequency to said data channel service enabled radio signal modulator and transmitter for transmission to a remote receiver, and a data channel service enabled receiver device, wherein the data channel, service enabled receiver receives data in a sideband of a high definition radio data stream.

14. The system of claim 13, wherein said data channel service enabled receiver device includes a receiver controller, said receiver controller automatically tuning said data channel service enabled receiver to the selected transmission frequency.

15. The system of claim 13, wherein said data channel service enabled receiver device includes a receiver controller and a display, said receiver controller displaying said selected transmission frequency on said display.

16. The system of claim 13, wherein said transmitter device controller automatically tunes said data channel service enabled radio signal modulator and transmitter to said selected transmission frequency for transmission of radio signals after said identification is transmitted to said remote receiver.

17. The system of claim 13, wherein said transmitter device controller automatically tunes said data channel service enabled radio signal modulator and transmitter to said selected transmission frequency for transmission of radio signals.

18. The system of claim 13, wherein said transmitter device controller interrupts transmission by said data channel service enabled radio signal modulator and transmitter while said frequency spectrum is examined.

19. The system of claim 13, wherein said controller and receiver of said transmitter device examine power levels for respective frequencies within said frequency spectrum.

* * * * *